(12) United States Patent
Chin et al.

(10) Patent No.: US 9,369,936 B2
(45) Date of Patent: Jun. 14, 2016

(54) HANDOVER TECHNIQUE FOR WIRELESS COMMUNICATIONS ENABLED DEVICES

(75) Inventors: Choong M Chin, Kuala Lumpur (MY); Andy Ly Low, Melaka (MY); Su Fong Chien, Melaka (MY)

(73) Assignee: BRITISH TELECOMMUNICATIONS public limited company, London (GB)

( * ) Notice: Subject to any disclaimer, the term of this patent is extended or adjusted under 35 U.S.C. 154(b) by 1640 days.

(21) Appl. No.: 12/594,500

(22) PCT Filed: Mar. 19, 2008

(86) PCT No.: PCT/GB2008/000972
§ 371 (c)(1),
(2), (4) Date: Oct. 2, 2009

(87) PCT Pub. No.: WO2008/119934
PCT Pub. Date: Oct. 9, 2008

(65) Prior Publication Data
US 2010/0130206 A1    May 27, 2010

(30) Foreign Application Priority Data

Apr. 2, 2007 (MY) .............................. PI 20070516
Oct. 3, 2007 (EP) ..................................... 07253924

(51) Int. Cl.
*H04W 36/00* (2009.01)
*H04W 36/30* (2009.01)
(Continued)

(52) U.S. Cl.
CPC .............. *H04W 36/30* (2013.01); *H04W 36/14* (2013.01); *H04W 36/36* (2013.01)

(58) Field of Classification Search
USPC .................................................. 455/436–445
See application file for complete search history.

(56) References Cited

U.S. PATENT DOCUMENTS 5,577,022 A * 11/1996 Padovani et al. .............. 370/332
6,052,598 A * 4/2000 Rudrapatna et al. ....... 455/456.1
(Continued)

FOREIGN PATENT DOCUMENTS

WO         03/105520         12/2003

OTHER PUBLICATIONS

International Search Report for PCT/GB2008/000972, mailed Oct. 10, 2008.
(Continued)

*Primary Examiner* — Kent Chang
*Assistant Examiner* — Scott Au
(74) *Attorney, Agent, or Firm* — Nixon & Vanderhye P.C.

(57) ABSTRACT

A method of triggering a network handover controlled by a communications device in a communications system comprising a plurality of networks with which the communications device can perform a handover operation to, the method comprising the steps of: determining a signal characteristic of each available candidate network in said communications system; forecasting a future value of said signal characteristic; determining a future handover margin for said signal characteristic of the network connection established by said communications device; determining if another available candidate network signal characteristic exceeds said handover margin at a future time, and if so, performing a handover operation to said other available candidate network, wherein said future handover margin for said signal characteristic is varied dynamically in dependence on said forecasted signal characteristic.

15 Claims, 5 Drawing Sheets

(51) Int. Cl.
*H04W 36/14* (2009.01)
*H04W 36/36* (2009.01)

(56) References Cited

U.S. PATENT DOCUMENTS

2004/0097233 A1   5/2004   Pecen et al.

2007/0072614 A1*  3/2007   Forsberg .................. 455/436

OTHER PUBLICATIONS

Pollini, "Trends in Handover Design", IEEE Communications Magazine, IEEE Service Center, New York, NY, US, vol. 34, No. 3, Mar. 1, 1996, pp. 82-90, XP000557380.

* cited by examiner

PRIOR ART

HANDOVER TECHNIQUE FOR WIRELESS COMMUNICATIONS ENABLED DEVICES

This application is the U.S. national phase of International Application No. PCT/GB2008/000972, filed 19 Mar. 2008, which designated the U.S. and claims priority to Malaysian Application No. PI 20070516, filed 2 Apr. 2007, and European Application No. 07253924.0, filed 3 Oct. 2007, the entire contents of each of which are hereby incorporated by reference.

BACKGROUND AND SUMMARY

The present invention relates to a handover technique for wireless communications enabled devices, In particular but not exclusively to mobile communications devices having multiple interfaces to different wireless network access points.

Mobile communications devices need to ensure that their network connection(s) support a suitable level of quality of service. Handover techniques to ensure that a mobile device has an appropriate connection for its current environment are well known, as is the use of time-series forecasting techniques to predict when a network handover is likely to be required. Such known handover decisions can be reactive (i.e., they occur when a characteristic of a received signal drops below a threshold) or predictive (i.e., they occur when it is anticipated that a characteristic of a received signal will drop below a threshold). It is known for handover decisions to be based on the received signal strength determined at the network end of the connection and/or at the communications device end.

A well known metric for on which to base the decision to perform a network handover either to another network of the same type (referred to in the art as a homogenous network handover) or to another network of a different type (referred to in the art as a heterogeneous network handover) is the received signal strength index (RSSI).

G. P. Pollini in his paper "Trends in Handover Design". IEEE Communications Magazine, March 1996, describes various algorithms which determine from RSSI derived determinants handover trigger conditions for a mobile communications device to change access points (APs) based on the RSSI determined by the device and/or network. For example, it is known to trigger a network handover when the RSSI of a target AP is greater than the combined sum of the RSSI of the serving AP and a fixed handover margin providing the RSSI of the service base station (BS) has fallen below a certain threshold. The use of the handover margin ensures that so called "ping-pong" handovers do not occur simply because of the fluctuations in signal strength which occur in wireless communications environments.

Figure 1A:
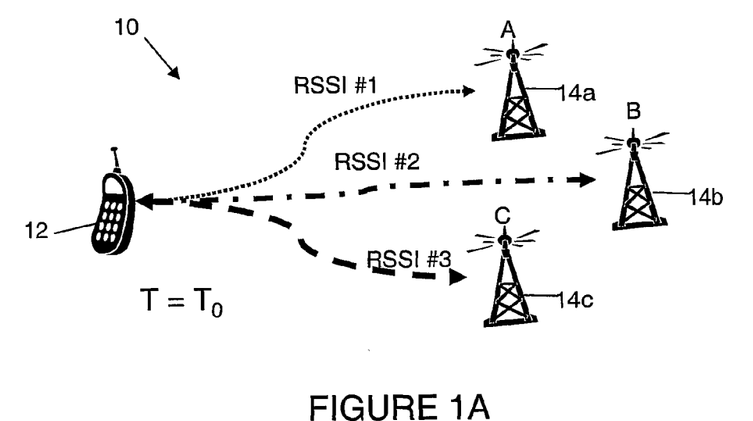
FIG. 1A shows a communications system at time $T=T_0$.
Figure 1B:
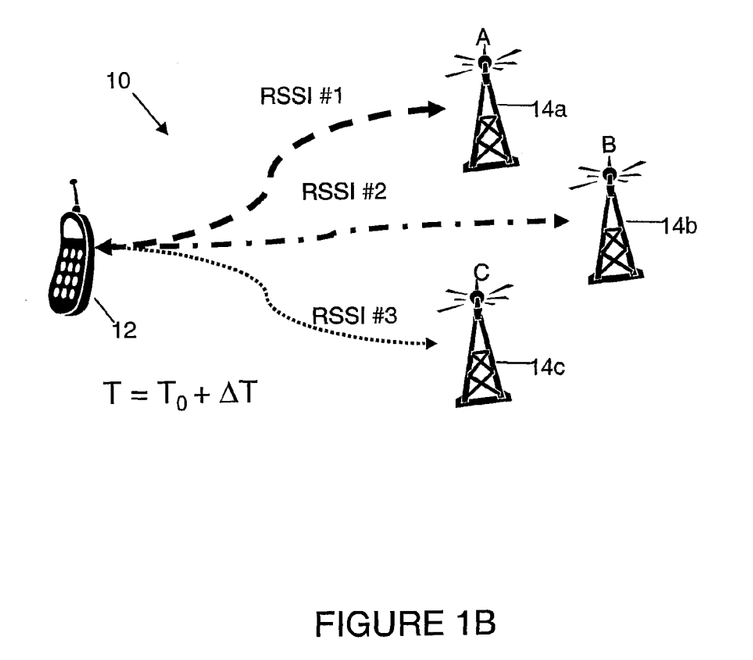
FIG. 1B shows the same communications system at time $T=T_0+\Delta T$.

Consider the exemplary scenario shown in FIGS. 1A and 1B of the accompanying drawings. FIG. 1A shows a communications system 10 comprising a wireless communications device 12, for example, a mobile telephony device 12 and a plurality of wireless network access points 14a, 14b, 14c. The mobile telephone device 12 comprises means to determine the RSSI of each of the access points 14a,b,c, respectively RSSI #1, #2, and #3 at time $T=T_0$. FIG. 1B shows the same communications system at time $T=T_0+\Delta T$. The lines shown in FIGS. 1A and 1B represent the relative signal strengths between the network access points 14a,b,c and the communications device 12. The dotted line shown in FIGS. 1A and 1B represents the signal with the weakest signal strength, the dot-dashed line the intermediate signal strength and the long dashed line representing the strongest signal strength. The comparative RSSIs #1, #2, and #3 at time $T=T_0$ are also shown schematically in FIG. 2A, and at $T=T_0+\Delta T$ in FIG. 2B.

Figure 2A:
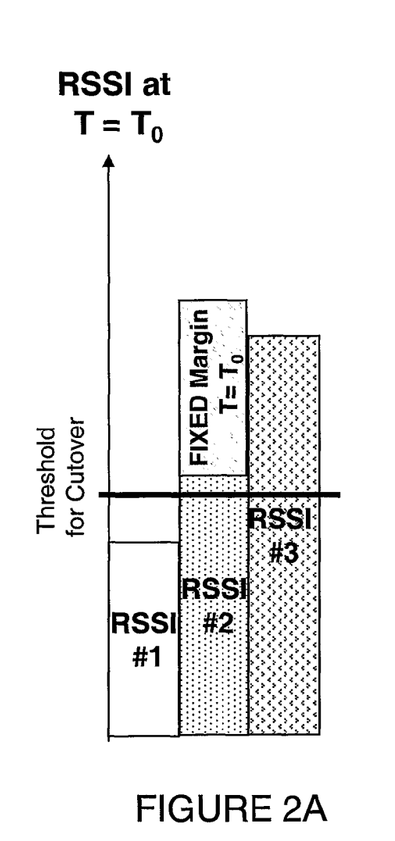
FIG. 2A shows a prior art RSSI handover margin handover scheme at time $T=T_0$.
Figure 2B:
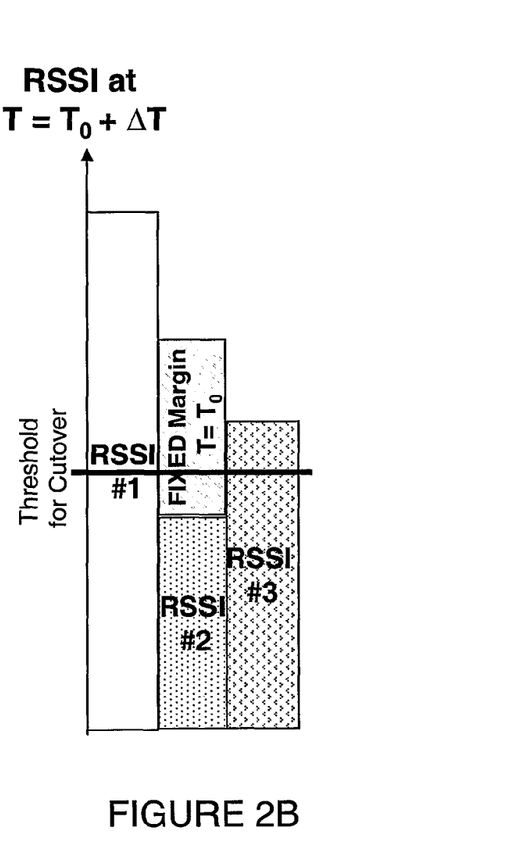
FIG. 2B shows a prior art RSSI handover margin handover scheme at time $T=T_0+\Delta T$.

In FIG. 2A at $T=T_0$ RSSI #1 is below the threshold for being a candidate network for handover, RSSI #2 is just above the threshold for handover but is less than the RSSI #3, which is the strongest signal received by the mobile communications device 12 from an access point. The present of the fixed handover margin, that Pollini describes, however, ensures that the mobile communications device does not handover to form a connection with access point 14c (i.e., it does not handover to network #3). This is because the value of the RSSI #3 is less than the value required by the handover margin, i.e., it does not sufficiently exceed the RSSI#2 by a value exceeding the handover margin. FIG. 2B shows that at a later time $T=T_0+\Delta T$, however, the signal from the network access point 14a has a RSSI #1 which is above the margin for handover for the signal from the network access point 14b and so the mobile communications device 12 performs a hand over from the network access point 14b with RSSI #2 to the network access point 14a providing the signal having RSSI #1.

The handover margins shown in FIGS. 2A and 2B are fixed so that the margin at $T=T_0+\Delta T$ has the same value as at $T=T_0$. Fixed margins where the RSSI of a signal between a communications device and a network access point for a candidate network must always rise by the same fixed value in order for that network to be selected for a network handover are used in the communications system handover scheme that Pollini describes. Such a fixed margin scheme for the signal strength is more suited in a line-of-sight situation between the network access point and the mobile communications device and is less appropriate in a non-line of sight environment and/or for a fast fading environment. Such environments can increase the delay until handover occurs, i.e., they can increase the average handover delay. It is desirable to minimise handover delay to try to maintain the best signal quality possible.

The invention seeks to obviate and/or mitigate the above limitations of the prior art by providing a handover scheme in which wireless communication devices do not wait until all connectivity is lost or a substantial degradation of link quality is measured in order to seek alternative access points and/or base stations.

The invention seeks to provide a handover scheme for heterogeneous wireless networks which varies the margin for network handover. In particular, but not exclusively, a handover scheme is provided in which a handover is triggered when the probability of a RSSI of a contender network rising above a threshold (as determined by the sum of the probable RSSI of the current network and a variable handover margin) exceeds the probability of other contender networks rising above the probable RSSI of the current network and a variable handover margin. The contender network with the highest probability is then selected for handover.

A handover is performed to the next available access point (AP) and/or base station (BS) which is based on a continuous monitoring of a plurality of wireless links within the heterogeneous network environment which are available for the handover operation. Accordingly, a wireless communication device measures the detected signal strengths of all available access points and/or base stations operating in a communications network prior to itself making a handover decision based on a time series forecasting technique of future signal strengths of the access points and/or base stations likely to be available to the communications device. This handover technique is thus different to other techniques known to those of ordinary skill in the art which involve algorithms which only make a trigger decision by monitoring the long-term or short-term trends of the access point and/or base station signals.

A first aspect of the invention provides a method of triggering a network handover performed by a communications network in a communications system comprising a plurality of networks with which the communications device can perform a handover operation to, the method comprising the steps of: determining a signal characteristic of each available candidate network in said communications system; forecasting a future value of said signal characteristic; determining a future handover margin for said signal characteristic of the network connection established by said communications device; and determining if another available candidate network signal characteristic exceeds said handover margin at a future time, and if so, performing a handover operation to said other available candidate network, wherein said future handover margin for said signal characteristic is dynimically varied in response to said forecast signal characteristic.

Another aspect of the invention seeks to provide apparatus arranged to implement a method of triggering a network handover performed by a communications network in a communications system comprising a plurality of networks with which the communications device can perform a handover operation to, the apparatus comprising: means to determine a signal characteristic of each available candidate network in said communications system; means to forecast a future value of said signal characteristic; means to determine a future protective margin for said signal characteristic of the network connection established by said communications device; means to determine if another available candidate network signal characteristic exceeds said protective margin at a future time, and if so, performing a handover operation to said other available candidate network, wherein said future handover margin for said signal characteristic is dynamically varied in response to said forecasted signal characteristic.

Another aspect of the invention seeks to provide a computer readable medium carrying program steps which when executed on any apparatus aspect causes the communication device to carry out appropriate steps in a method aspect. The margin may vary with time and/or with the location of the communications device and/or with the number of candidate networks. The future predicted handover margin may be dynamically dependent on the predicted the probability of a false trigger occurring. The future handover margin may be dynamically dependent on the predicted the probability of a false non-trigger occurring.

The aspects and preferred features of the invention are as described herein above and by the accompanying independent and dependent claims respectively, and may be combined in any appropriate manner apparent to those skilled in the art.

BRIEF DESCRIPTION OF THE DRAWINGS

Preferred embodiments of the invention will now be described with reference to the accompanying drawings which are by way of example only, and in which.

DETAILED DESCRIPTION OF PRESENT EXAMPLE EMBODIMENTS

In the following description, for purposes of explanation, numerous specific details are set forth in order to provide a thorough understanding of the present invention. It will be evident however to one of ordinary skill in the art that the present invention may be practiced without these specific details. In other instances well-known structures and devices are shown in simplified diagrammatic form to facilitate explanation and additional detail known to one of ordinary skill in the art has been omitted for clarity. The description of preferred embodiments is not intended to limit the scope of the claims appended hereto.

The invention relates to a handover scheme for heterogeneous wireless networks which is triggered using a variable handover margin. Referring again to FIGS. 1A and 1B of the accompanying drawings, a wireless communications system 10 is provided where a client communications device 12 communicates with multiple networks through access points (APs) 14a,b,c. Examples of suitable communications devices include mobile telephony devices as well as other device which are capable of changing their location and network connectivity. As the position of the communications device 12 varies, the network traffic load of the communications system and as each channel condition changes over time, the communications device 12 monitors the available networks and the corresponding link pipe properties, for example, network link characteristics such as the quality of channels (to maintain acceptable data rate, signal quality, BER, PER, etc). The mobile communications device 12 must decide pro-actively, from the link layer perspective, when it is the best time to switch to another network or channel.

The invention uses a smart trigger technique to trigger a heterogeneous network handover. The term "smart trigger" is used herein to refer to a link-level trigger as is, for example, defined in IEEE 802.21. The link-level trigger provides state and predictive information about the link to the communication device.

In a preferred embodiment of the invention, vertical handovers are initiated by the client mobile communications device 12 using one or more smart triggers to select the best available AP 14a,b,c for seamless connectivity. The smart triggers are determined using a conventional time series forecasting techniques derived from the current RSSI values. The smart triggers advantageously enable one embodiment of a mobile communications device according to the invention to initiate a handover procedure with less error margin. One embodiment of the invention also reduces computational complexities (compared with other forecasting techniques known in the art). This is shown in more detail in FIGS. 3A and 3B of the accompanying drawings.

Figure 3A:
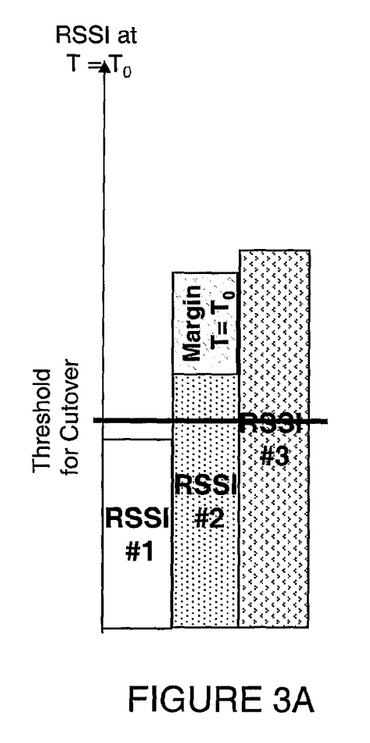
FIG. 3A shows a RSSI handover margin handover scheme according to an embodiment of the invention at time $T=T_0$.
Figure 3B:
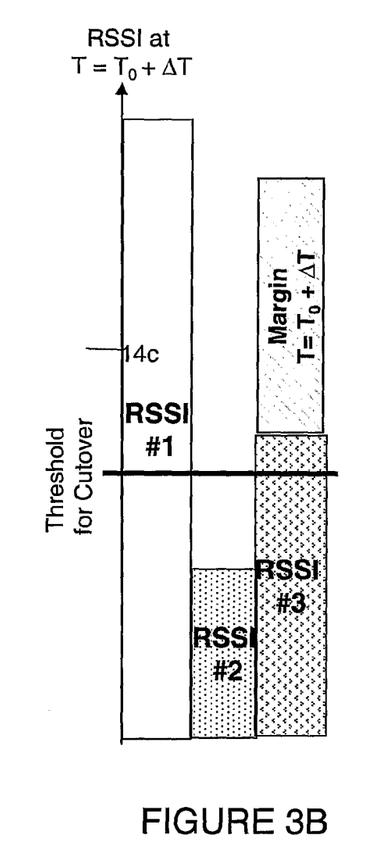
FIG. 3B shows the scheme of the embodiment of the invention shown in FIG. 3A at time $T=T_0+\Delta T$.

In FIG. 3A, at time $T=T_0$ the RSSI handover margin width is much less than the RSSI handover margin width $T=T_0+\Delta T$. In this scenario, at time $T=T_0$ the network would hand over to RSSI #3, whereas it did not where the value of the handover margin was fixed (contrast with the fixed margin value scenario shown in FIG. 2A). In FIG. 3B, at time $T=T_0+\Delta T$, the handover margin has changed. Now the handover margin at time $T=T_0+\Delta T$ is much larger than it was at time $T=T_0$, but even so, the RSSI #1 is sufficiently large itself to result in a network handover to the network access point 14a.

Figure 4:
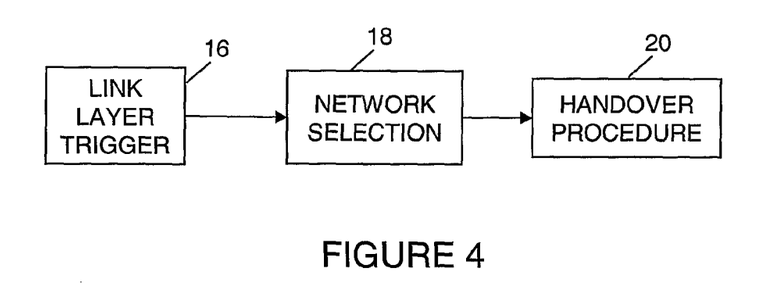
FIG. 4 shows a handover flow chart according to the invention.

FIG. 4 of the accompanying drawings shows the main steps in a handover technique in terms of a handover flow chart. Firstly, a link layer trigger step (16) occurs if a system component monitoring the link layer properties determines a threshold has been crossed. Secondly, a network selection step (18) occurs in which a system component selects a target network technology and base station/access point. Finally, the handover takes place (20).

Those of ordinary skill in the art will be aware of handover algorithms known in the art which wait until the link quality between the mobile device 12 and its access point (AP) deteriorates substantially before invoking a trigger mechanism which connect the device 12 to the nearest available AP. Various embodiments of the invention however seek to provide a handover scheme for a communications system comprising a plurality of mobile communications devices in which each mobile device does not wait until all connectivity is lost or a substantial degradation of link quality is measured in order to seek alternative APs 14a,b,c. Instead handovers to the next available AP 14a,b,c is based on a continuous monitoring of all wireless links within the heterogeneous network environment.

The mobile device 12 measures the signal strengths of the (Ideally all) available APs 14a,b,c operating in the network (current channel and partial overlapping channels) and then the mobile device 12 makes its decision based on a time series forecasting technique of future signal strengths of the APs 14a,b,c. To make reliable forecast of RSSI values of neighbouring AFs 14a,b,c a statistical model is built for a time series of RSSI values for each of the co-channel and partially overlapping channel APs within the client vicinity. Time-series and forecasting scheme such as the AutoRegressive integrated Moving Average (ARIMA) model are well known to those of ordinary skill in the art.

In one embodiment of the invention, the Box-Jenkins (see G. E. P. Box, G. M. Jenkins and G. C. Relnsel, Time Series Analysis: Forecasting and Control, Third ed. Holden-Day, 1994) methodology is utilised where the technique advocates an AutoRegressive Integrated Moving Average (ARIMA) model to find the best fit of an RSSI time series $\{X_t\}_{i=1}^{N}$ to its past values in order to make forecasts. Here $X_t$ represents the value of the RSSI at time t in the time series and N is the size of the window for the series of data. Let $\epsilon_t$ denote a series of uncorrelated random variables with mean zero and variance $\sigma^2$. A moving average process of order q (MA(q)) is defined by $$X_t = \sum_{j=0}^{q} \beta_j \varepsilon_{t-j} \quad (1)$$

where $\beta_j$ represents a parameter value of the time series being modelled and where an autoregressive process of order p (AR(p)) is defined by $$X_t = \sum_{i=1}^{p} \alpha_i X_{t-i} + \varepsilon_t. \quad (2)$$

where $\alpha_i$ represents a parameter value of the model. Hence an ARMA(p,q) process is defined by a model with p autoregressive terms and q moving average terms as:

$$X_t = \sum_{i=1}^{p} \alpha_i X_{t-i} + \sum_{j=0}^{q} \beta_j \varepsilon_{t-j}. \quad (3)$$

On the other hand an ARIMA(p,d,q) process is a process whose d-th difference $\nabla^d X_t = \nabla^{d-1}(\nabla X_t) = \nabla^{d-1} X_t - \nabla^{d-1} X_{t-1}$ is an ARMA(p,q) process.

In order to successfully model the time series via Box-Jenkins model, the first stage is to determine whether the selected series is stationary or if there is any significant seasonality that needs to be corrected (via spectral analysis). For the model selected in one embodiment of the invention a time series was defined as being strongly/strictly stationary if $(X_t, X_{t+1}, \ldots, X_{t+h})$ has the same joint distribution as $(X_s, X_{s+1}, \ldots, X_{s+h})$ for all t, s and h, and a time series is determined to be weakly stationarity or stationary. If $E(X_t) = E(X_{t+h}) = \mu < \infty$ and $Var(X_t) = \sigma_x^2 < \infty$ and $Cov(X_t, X_{t+h}) = Cov(X_s, X_{s+h}) < \infty$. Once the stationarity and seasonality aspects of the time-series have been addressed (i.e., accounted for and/or removed), plausible values of p and q are determined using conventional techniques, for example, by comparing the sample autocorrelation and partial autocorrelation plots with their theoretical counterparts. The shape of the sample autocorrelation function is an indicator of an appropriate model for use in the best mode of the invention currently contemplated by the inventors.

| SHAPE | INDICATED MODEL |
| --- | --- |
| Exponential, decaying to zero | AR model. Use the partial autocorrelation plot to identify the order of the autoregresive model. |
| Alternating positive and negative spikes, decaying to zero at higher lags | AR model. Use the partial autocorrelation plot to help identify the order. |
| One or more spikes, with the rest essentially zero | MA model. Order q can be identified when plot becomes zero at lags q + j where j ≥ 1. |
| Decay, starting after a few lags | ARMA model |
| All zero or close to zero | Data is essentially random. |
| High values at fixed intervals | Include seasonal autoregressive term. |
| No decay to zero | Series is not stationary. |

Table 1 shows how the shape of the sample autocorrelation function indicates a particular forecasting model.

Whilst some embodiments of the invention use sample autocorrelattons and partial autocorrelations function values to select the order of the series, other embodiments of the invention determine which ARIMA process is selected by using the Akaike's Information Criterion (AIC) (see H. Akaike, "A new look at the statistical model identification", IEEE Transactions on Automatic Control, Vol 19 (6), pp. 716-723, 1974) or by using the Bayesian Information Criterion (BIC) technique for the selection of the appropriate ARMA processes (see G. Schwarz, "Estimating the dimension of a model", Annals of Statistics, Vol 6, pp. 461-464, 1978). Alternatively the order of the series can be determined using any other appropriate selection technique known to those of ordinary skill in the art.

The range of potential ARMA models is estimated by maximum likelihood methods known to those of ordinary skill in the art. For a sample window size of N, the AIC is given by $$AIC(p, q) \approx \ln(\hat{\sigma}_a^2) + \frac{2(p + q + 1)}{N} + c \quad (4)$$

and the BIC is given by $$BIC(p, q) = \ln(\hat{\sigma}_a^2) + \frac{(p + q + 1)\ln(N)}{N} \quad (5)$$

where $\hat{\sigma}_a^2$ denotes the maximum likelihood estimate, p and q are the order of parameters estimated in the model, and c is a constant term. In the information criterion approach, the order (p, q) of the ARMA is chosen as the one that minimizes either the AIC or BIC.

This procedure provides a relatively fast model selection and is obtained without undergoing any visual inspection of the sample autocorrelation and partial autocorrelation function of the series. Once the model is identified through fitting processes such as AIC or BIC, a test is automatically generated to assess the suitability of the time series model selected, such as, for example, a portmanteau test of the residuals (see Box et al. (1994)), and, if the model is accepted, that model is then used to predict the RSSI at the next time step.

At the forecasting stage, for an ARMA(p,q) model, once the parameter values $\hat{\alpha}_i$, i=1, 2, . . . , p and $\hat{\beta}_j$, j=0, 1, 2, . . . , q are estimated, and as $\hat{\epsilon}_t = X_t - \hat{X}_t$ where $\hat{X}_t$ is an approximate value of $X_t$ from the ARMA model, for each lead time l≥1, the forecast values $\hat{X}_{t+l}$ can be determined from:

$$\hat{X}_{t+\ell} = \begin{cases} \sum_{i=1}^{p} \hat{\alpha}_i \hat{X}_{t+\ell-i} + \sum_{j=0}^{q} \hat{\beta}_j \hat{\epsilon}_{t+\ell-j} & \text{if } \ell \leq q \\ \sum_{i=1}^{p} \hat{\alpha}_i \hat{X}_{t+\ell-i} & \text{if } \ell > q. \end{cases} \quad (6)$$

The forecasting stage aims at obtaining a forecast function in which the difference between the actual and forecasted RSSI values is as small as possible for each lead time. The difference between the actual and forecasted RSSI values can be minimised if an appropriate forecasting model is selected. This is achieved by the model selection stage. In the Box-Jenkins model, the autoregressive operator decides the nature of the eventual forecast whilst the moving average operator is influential in determining the forecasted value up until its estimated order. In addition to calculating the best forecast, it is also necessary to specify their accuracy, so that, the risks associated with such a decision may be calculated. We do this by calculating probability limits on either side of each forecast, for example 50% and 95%.

Figure 5:
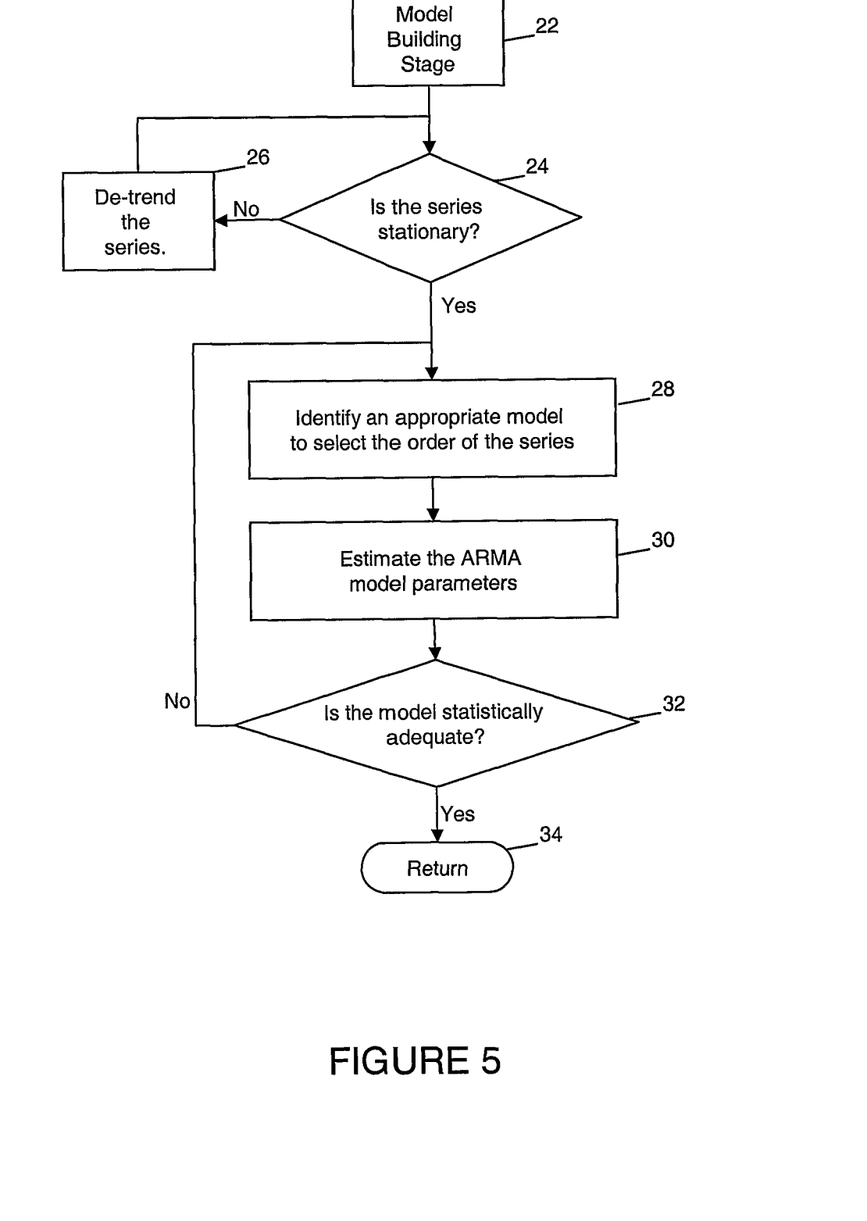
FIG. 5 shows stages in a forecast generation scheme according to an embodiment of the invention.

FIG. 5 of the accompanying drawings summarizes the iterative approach to building a model of a time series data using an appropriate window size. After a suitable model has been selected (not shown), the first step involves building the forecasting model (step 22) assuming that the data on which the forecast is to be performed do not exhibit any seasonal characteristics. Any trends etc. are only removed from the time series generated after the forecasting model has been generated. In one embodiment of the invention, the Box-Jenkins model is selected and accordingly a Box-Jenkins Model Building stage will be built in step 22.

A check is then performed to determine if the time series is stationary (step 24). If the time series is not stationary the the series may be detrended using a difference method (step 26). If the time-series is stationary, then an appropriate model is identified via AIC or BIC approach (step 28), the ARIMA model parameteres for $\alpha_i$,i=1, 2, . . . p; $\beta_j$,j=0, 1, 2, . . . , q are estimated (step 30), and a check performed to determine if the model is statistically adequate (step 32). If not, then the process repeats. If the model is statistically adequate then the a return functionality is performed (step 34).

In order to perform a handover operation, the client communications device 12 uses information on all the APs 14a, b,c operating on the current communication channel as well as any other prospective communication channels to which a handover may be performed (for example, overlapping channels which have a frequency bandwidth which overlaps with the frequency band of the channel currently used by the mobile communications device 12).

According to an embodiment of the invention, the client communications device 12 will generate a handover event trigger if its present AP forecasted RSSI value falls below its threshold value and if the forecasted RSSI value of a future AP exceeds its current AP forecasted RSSI value.

By denoting the neighbouring AP RSSI values as $Y_t^{(i)}$ where i=1, 2, . . . , M where M is the total number of all the neighbouring APs sharing either the same channel or overlapping channels, hence the client would only issue a trigger when $$\hat{X}_{t+l} \leq \overline{X} \text{ and } \hat{Y}_{t+l}^{(j)} \geq \hat{X}_{t+l} \quad (7)$$

where the index j is defined as $$j = \{i: \max\{\hat{Y}_{t+l}^{(i)} - \overline{Y}^{(i)}, 0\}, i=1,2,\ldots,M\} \quad (8)$$

where $\overline{X}$ is the current AP RSSI threshold representing the mobile client minimal quality of service (QoS) it must support in order to operate successfully, $\overline{Y}^{(i)}$ is the i-th neighbouring RSSI threshold value and $\hat{Y}_{t+l}^{(j)}$ is the highest predicted RSSI value of all the neighbouring APs. The expression (8) denotes that the algorithm would only choose the "best" neighbouring AP for a handover from its current default AP. On the other hand, if there are no better APs operating on the same channel or overlapping channels, then the algorithmic scheme will not trigger a handover event. But in the event, if the current AP experienced a link deterioration, then a trigger is invoked via a scan-based handover (choosing the "best" AP with the highest signal strength). Based on the forecasted RSSI values of the current AP and in order to minimize the error of decision making, a protection margin (or hysteresis factor) $\Delta_x \geq 0$ is provided according to an embodiment of the invention.

The protection margin augments the RSSI threshold value, $\overline{X}$ so that the client communications device has an enhanced threshold value, $\overline{X} + \Delta_x$ to ensure a better QoS. If the forecasted RSSI value is greater than the enhanced threshold value, then the system would not trigger a handover to another AR. Otherwise the client communications device 12 triggers a handover mechanism from its current AP and if the RSSI of a neighbouring AP is high enough then the client would switch to that new AP to be connected with.

There are two limitations to the above embodiment. The procedure described above can generate two types of error a false trigger error or a missing trigger error. The false trigger error generates a trigger for performing a handover which not necessary (i.e., which is an unnecessary triggger). A false non-trigger is a missing trigger which means that a handover is not performed when it should be.

With this protection margin $\Delta_x$, and for a forecasted RSSI value $\hat{X}_{t+l}$ the probability in making a false trigger is defined as:

$$P(\hat{X}_{t+l} \leq \overline{X} + \Delta_x, X_{t+l} \geq \overline{X}) \quad (9)$$

where it is the error of committing a false trigger when the true RSSI value $X_{t+l}$ is greater than the threshold requirement $\overline{X}$ but the forecasted RSSI value, $\hat{X}_{t+l}$ shows that it is lower than the threshold value plus the protection margin. On the other hand, if the true RSSI value $X_{t+l}$ is less than the threshold requirement $\overline{X}$ but the forecasted RSSI value $\hat{X}_{t+l}$ concludes that it is greater than the threshold value plus the protection margin, then the scheme is committing a false non-trigger error and we define the probability of making a false non-trigger as $$P(\hat{X}_{t+l} \geq \overline{X} + \Delta_x, X_{t+l} \leq \overline{X}) \quad (10)$$

Unlike assigning the protection margin with a fixed value (see V. Mhatre and K. Papaglannaki, "Using smart triggers for improved user performance in 802.11 wireless networks", MobiSys'06, June 2006), for a given margin error $\delta \in (0,1)$, the optimal protection margin $\Delta^*_x \geq 0$ is determined in an adaptive manner, for example, by solving the following optimization problem:

$$P \begin{cases} \underset{\Delta_x \geq 0}{\text{minimize}} & P(\hat{X}_{t+l} \geq \overline{X} + \Delta_x, X_{t+l} \leq \overline{X}) \\ \text{subject to} & P(\hat{X}_{t+l} \leq \overline{X} + \Delta_x, X_{t+l} \geq \overline{X}) = \delta. \end{cases} \quad (11)$$

Given the stationarity of the time series model (i.e. assuming the processed time series is stationary), the residuals $\hat{X}_t - X_t$ can be expressed as: $\epsilon_t = \hat{X}_t - X_t \sim N(\mu_\epsilon, \sigma_\epsilon^2)$ where $E(\epsilon_t) = \mu_\epsilon$, $Var(\epsilon_t) = \sigma_\epsilon^2$ and $X_t$ is the true RSSI value at time t. Hence the probability of a false trigger occurring is:

$$P(\text{false trigger}) = P(\hat{X}_{t+l} \leq \overline{X} + \Delta_x, X_{t+l} \geq \overline{X}) \quad (12)$$

$$= \int_{\overline{X}}^{\infty} P\left(Z \leq \frac{\overline{X} + \Delta_x - X - \mu_\epsilon}{\sigma_\epsilon} \bigg| X = x\right) f_x(x) dx$$

$$= \int_{\overline{X}}^{\infty} \int_{-\infty}^{\frac{\overline{X} + \Delta_x - x - \mu_\epsilon}{\sigma_\epsilon}} \frac{1}{\sqrt{2\pi}} e^{-\frac{1}{2}z^2} dz f_x(x) dx$$

and the probability of a false non-trigger is given by:

$$P(\text{false non-trigger}) = P(\hat{X}_{t+l} \geq \overline{X} + \Delta_x, X_{t+l} \leq \overline{X}) \quad (13)$$

$$= \int_{-\infty}^{\overline{X}} P\left(Z \geq \frac{\overline{X} + \Delta_x - X - \mu_\epsilon}{\sigma_\epsilon} \bigg| X = x\right) f_x(x) dx$$

$$= \int_{-\infty}^{\overline{X}} \int_{\frac{\overline{X} + \Delta_x - x - \mu_\epsilon}{\sigma_\epsilon}}^{\infty} \frac{1}{\sqrt{2\pi}} e^{-\frac{1}{2}z^2} dz f_x(x) dx$$

where $Z \sim N(0,1)$ and $f_x(x)$ is the probability density function (pdf) of the true RSSI values. Those of ordinary skill in the art will appreciate that the way in which the RSSI values are distributed does not affect the invention. One way for example is to approximate the RSSI values with a simple uniform distribution, normal or even log-normal distribution.

Once the probability distribution function (pdf) of the true RSSI is known and by substituting the expressions (12)-(13) into the optimization Problem P, and for a selected margin error $\alpha \in (0,1)$ the optimal protection margin $\Delta^*_x$ for various RSSI threshold values can be determined as described hereinbelow.

In addition, for the forecasted RSSI values of neighbouring APs (via Box-Jenkins model), and for each of the i-th APs, a protection margin $\Delta_y^{(i)} \geq 0$ is provided which minimizes the error of false selection of an AP for handover.

By analogy with the probabilities of making a false trigger and a false non-trigger, for each neighbouring APs, the probability of making false selection of an AP is $$P(\hat{Y}_{t+l}^{(i)} \geq \overline{Y}^{(i)} + \Delta_y^{(i)}, Y_{t+l}^{(i)} \leq \overline{Y}^{(i)}), i=1,2,\ldots,M \quad (14)$$

and the probability of making a false rejection of an AP as $$P(\hat{Y}_{t+l}^{(i)} \leq \overline{Y}^{(i)} + \Delta_y^{(i)}, Y_{t+l}^{(i)} \geq \overline{Y}^{(i)}), i=1,2,\ldots,M \quad (15)$$

where $\hat{Y}_{t+l}^{(i)}$ and $\overline{Y}^{(i)}$ are the i-th AP forecasted RSSI value for leads $l \geq 1$ and its RSSI threshold value respectively. Furthermore, given the stationarity of the time series model the residuals $\hat{Y}_t^{(i)} - Y_t^{(i)}$ are given by $$\epsilon_t^{(i)} = \hat{Y}_t^{(i)} - Y_t^{(i)} \sim N(\mu_\epsilon^{(i)}, (\sigma_\epsilon^{(i)})^2) \quad (16)$$

where $E(\epsilon_t^{(i)}) = \mu_\epsilon^{(i)}$, $Var(\epsilon_t^{(i)}) = (\sigma_\epsilon^{(i)})^2$ and $Y_t^{(i)}$ is the true RSSI value at time t for i-th neighbouring AP.

Based on the normality properties of the residuals, for a given margin error $\delta^{(i)} \in (0,1)$, the respective protection margin $\Delta_y^{(i)*} \geq 0$ can be optimally found for each neighbouring AP in an adaptive manner by solving the following optimization problem:

$$P^{(i)} \begin{cases} \underset{\Delta_y^{(i)} \geq 0}{\text{minimize}} & P(\hat{Y}_{t+l}^{(i)} \leq \overline{Y}^{(i)} + \Delta_y^{(i)}, Y_{t+l}^{(i)} \geq \overline{Y}^{(i)}) \\ \text{subject to} & P(\hat{Y}_{t+l}^{(i)} \geq \overline{Y}^{(i)} + \Delta_y^{(i)}, Y_{t+l}^{(i)} \leq \overline{Y}^{(i)}) = \delta^{(i)}. \end{cases}$$

Accordingly, the probability of a false AP selection occurring is, using similar steps to those described above, given by:

$$P(\text{false AP selection}) = P(\hat{Y}_{t+l}^{(i)} \geq \overline{Y}^{(i)} + \Delta_y^{(i)}, Y_{t+l}^{(i)} \leq \overline{Y}^{(i)}) \quad (17)$$

$$= \int_{-\infty}^{\overline{Y}^{(i)}} P\left(Z^{(i)} \geq \frac{\overline{Y}^{(i)} + \Delta_y^{(i)} - Y^{(i)} - \mu_\epsilon^{(i)}}{\sigma_\epsilon^{(i)}} \bigg| Y^{(i)} = y\right) f_{Y^{(i)}}(y) dy$$

$$= \int_{-\infty}^{\overline{Y}^{(i)}} \int_{\frac{\overline{Y}^{(i)} + \Delta_y^{(i)} - y - \mu_\epsilon^{(i)}}{\sigma_\epsilon^{(i)}}}^{\infty} \frac{1}{\sqrt{2\pi}} e^{-\frac{1}{2}z^2} dz f_{Y^{(i)}}(y) dy$$

and the probability of a false AP rejection occurring is:

$$P(\text{false AP rejection}) = P(\hat{Y}_{t+l}^{(i)} \leq \overline{Y}^{(i)} + \Delta_y^{(i)}, Y_{t+l}^{(i)} \geq \overline{Y}^{(i)}) \quad (18)$$

$$= \int_{\overline{Y}^{(i)}}^{\infty} P\left(Z^{(i)} \leq \frac{\overline{Y}^{(i)} + \Delta_y^{(i)} - Y^{(i)} - \mu_\epsilon^{(i)}}{\sigma_\epsilon^{(i)}} \bigg| Y^{(i)} = y\right) f_{Y^{(i)}}(y) dy$$

$$= \int_{\overline{Y}^{(i)}}^{\infty} \int_{-\infty}^{\frac{\overline{Y}^{(i)} + \Delta_y^{(i)} - y - \mu_\epsilon^{(i)}}{\sigma_\epsilon^{(i)}}} \frac{1}{\sqrt{2\pi}} e^{-\frac{1}{2}z^2} dz f_{Y^{(i)}}(y) dy$$

where $Z \sim N(0,1)$ and $f_{Y^{(i)}}(y)$ is the probability density function (pdf) of the true RSSI values of the neighbouring i-th AP. The distribution of the neighbouring APs RSSI values can be modelled, for example as uniform, normal or log-normal distributed random variables, using any appropriate techniques well known to those of ordinary skill in the art. By substituting the above expressions (17)-(18) into the optimization Problem $P^{(i)}$, and for a selected margin error $\delta^{(i)} \in (0,1)$, the optimal protection margin $\Delta_y^{(i)*}$ for various RSSI threshold values of other APs can be determined.

Thus in one embodiment of the invention, the criterion of a handover from a current AP to another AP is given by:

$$\hat{X}_{t+l} \leq \bar{X} + \Delta^*_x \text{ and } \hat{Y}_{t+l}^{(j)} \geq \hat{X}_{t+l} \quad (19)$$

where the index j is defined as $$j = \{i : \max\{\hat{Y}_{t+l}^{(i)} - \bar{Y}^{(i)} - \Delta_y^{(i)*}, 0\}, i = 1, 2, \ldots, M\}. \quad (20)$$

Figure 6:
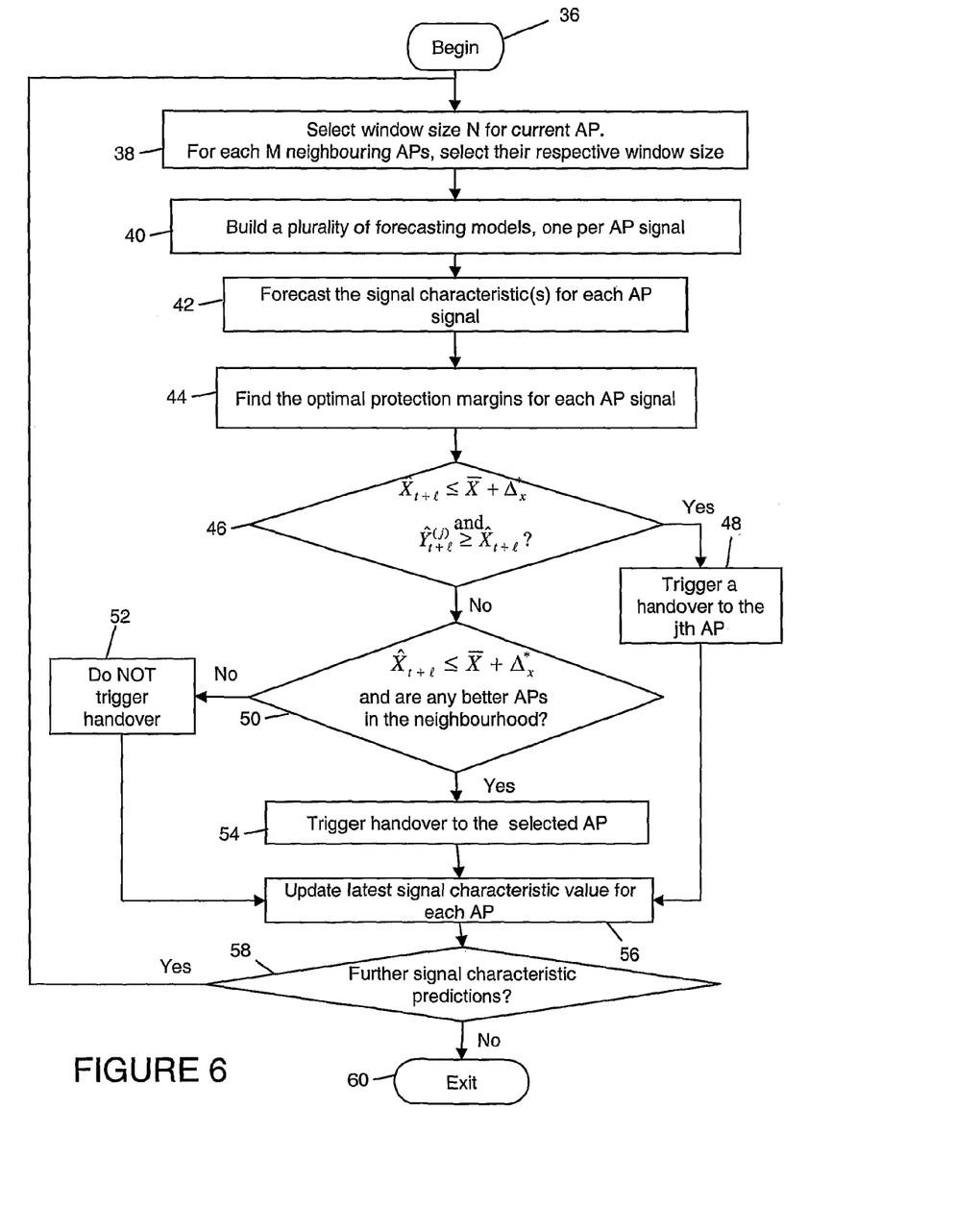
FIG. 6 shows stages in a flow chat for triggering a handover according to an embodiment of the Invention.

FIG. 6 of the accompanying drawings shows an overview of the handover process for one embodiment of the invention. FIG. 6 indicates various steps in a method of determining when a mobile device is to perform a handover operation based on a time series forecasting of one or more signal characteristics, for example, the RSSI signal characteristic.

In FIG. 6, the handover process begins with a window selection step (step 36) and the next step involves selecting an appropriate window size N from the signal characteristic time series values of the AP 14b to which the mobile communications device 12 is currently connected and for each of the M neighbouring APs 14a,c in the communications system (for example, in the scenarios shown in FIGS. 1A and 1B, M=2 as the APs 14a,c are the neighbours to the currently connected AP 14b and the signal characteristic time series comprises the time series of RSSI values for each AP), select their respective time window size $N^{(i)}$, where i=1, 2, ..., M.

The next step is to build a forecasting model for the signal characteristics of each of the neighbouring APs and the AP to which the device is presently collected (step 40). In a perferred embodiment of the invention, the Box-Jenkins Model is built at this stage for all the APs. Then one or more signal characteristics for each of the APs to which the mobile communications device can connect to (including the currently connected AP) are forecast for a leadtime i≥1 in step 42. Next the optimal protection margins for each AP signal are determined $\Delta^*_x$, $\Delta_y^{(i)*}$, for i=1, 2, ..., M (step 44). The conditions for a mobile communications device to handover from one AP to another AP requires the determination of:
  i) whether the forecasted value for the signal characteristic value of the current AP is less than or equal to the threshold requirement added to the optimal protection margin for the current signal, i.e., is $\hat{X}_{t+l} \leq \bar{X} + \Delta^*_x$ satisfied; and
  ii) is the jth AP forecasted signal characteristic value at leadtime i>1 which can be given by $\hat{Y}_{t+l}^{(j)}$ larger than or equal to the forecasted value for the signal characteristic value of the current Access Point, i.e., $\hat{Y}_{t+l}^{(j)} \geq \hat{X}_{t+l}$?

In the general embodiment of the invention, Y and X refer to any suitable signal characteristic (which may be absolute or relative) or suitable combination of signal characteristics of the signals the APs 14a,b,c in the communications system 1 provide to the mobile communication device 12. Accordingly, in step 46 if the criterion of a handover from a current AP to another AP given by $$\hat{X}_{t+l} \leq \bar{X} + \Delta^*_x \text{ and } \hat{Y}_{t+l}^{(j)} \geq \hat{X}_{t+l} \quad (19)$$

where the index j is defined as $$j = \{i : \max\{\hat{Y}_{t+l}^{(i)} - \bar{Y}^{(i)} - \Delta_y^{(i)*}, 0\}, i = 1, 2, \ldots, M\}. \quad (20)$$

is met, then a handover is triggered to the jth AP (step 48). If instead, $\hat{X}_{t+l} \leq \bar{X} + \Delta^*_x$ is met indicating a handover should be triggered ideally as the signal characteristic value (for example, the RSSI) will fall below the mean value plus the optimum margin, but the second criteria are not met, then a check is performed to determine if there are any better signals to any APs in the neighbourhood (step 50). If there are none, then a handover event is not triggered (step 52). If there is at least one AP offering a better quality of signal characteristic, then an AP is selected for handover and a scan-based handover is triggered to the AP best meeting the selection criteria (step 54).

Regardless of whether a handover has been determined as necessary (step 48 or step 54) or not necessary (step 52), the signal characteristic values need to be updated for each of the APs in the communications system which are available to the mobile communications device to handover to (step 56). If there are any remaining signal characteristic predictions to perform (step 58) the method then loops back to the step 38 which selects the window size for each of the APs 14a,b,c available to the mobile communications device 12 in the communications system 1. If no further signal characteristic value predictions are required the method terminates (step 60).

Thus a method of providing a predicted margin handover scheme is provided by the invention which provides a variable margin according to one or more signal characteristics, (having absolute or relative values) such as the RSSI of a signal. Those of ordinary skill in the art will appreciate that in other embodiments of the invention described herein, where explicit reference to the RSSI signal characteristic is made, this should be regarded as a synechdoche for alternative forms of suitable signal characteristics.

Modifications to the above features of the invention and features having equivalent effect to the features known to those skilled in the art are implicitly included in the description, and the scope of the invention should be determined by the accompanying claims.

What is claimed is:

1. A method of triggering a network handover in a communications system comprising a mobile communications device and a plurality of network access points, wherein a plurality of said network access points provide at least one signal to said mobile communications device, the method comprising:
    determining one or more signal characteristics of each communications channel available to the mobile communications device to establish communications with a network access in said communications system;
    forecasting a future value of each said signal characteristic;
    forecasting a future handover margin for each said signal characteristic; and
    determining if, at a predetermined future point in time, another communications channel is available to another network access point for the mobile communications device to handover to from the current communications channel established with the current network access point by determining if the future value of a signal characteristic of said other communications channel is predicted at that time to exceed the value of the equivalent signal characteristic of the current communications channel at that time by at least the value of the handover margin predicted at that time,
    wherein the future handover margin is dynamically dependent on the predicted probability of a trigger error occurring.

2. A method as claimed in claim 1, wherein the method further comprises:

the mobile communications device controlling the handover operation to said other network access point via said other communications channel.

3. A method as claimed in claim 1, wherein the forecasted value of said handover margin for each said signal characteristic is varied dynamically in dependence on the forecasted value of the respective signal characteristic.

4. A method as claimed in claim 1, wherein at least one said signal characteristic is determined at a network access point.

5. A method as claimed in claim 1, wherein at least one said signal characteristic is determined at the mobile communications device.

6. A method as claimed in claim 1, wherein at least one said signal characteristic comprises a received signal strength index (RSSI) of a signal between a network access point and the mobile communications device.

7. A method of triggering a network handover controlled by a communications device in a communications system comprising a plurality of networks with which the communications device can perform a handover operation to, the method comprising the steps of:
   determining a signal characteristic of each available candidate network in said communications system;
   forecasting a future value of said signal characteristic;
   determining a future handover margin for said signal characteristic of the network connection established by said communications device;
   determining if another available candidate network signal characteristic exceeds said handover margin at a future time, and if so, performing a handover operation to said other available candidate network, wherein said future handover margin for said signal characteristic is dynamically varied in response to said forecast signal characteristic, and
   wherein the future handover margin is dynamically dependent on the predicted probability of a trigger error occurring.

8. A method as claimed in claim 7, wherein the margin varies with the location of the communications device.

9. A method as claimed in claim 8, wherein the margin varies with the number of candidate networks.

10. A method as claimed in claim 8, wherein a trigger error comprises a false trigger error.

11. A method as claimed in claim 8, wherein the trigger error comprises a false non-trigger.

12. Apparatus arranged to perform a method of triggering a network handover in a communications system comprising a mobile communications device and a plurality of network access points, wherein a plurality of said network access points provide at least one signal to said mobile communications device, the apparatus comprising:
   one or more signal processors arranged to determine one or more signal characteristics of each communications channel available to the mobile communications device to establish communications with a network access point in said communications system;
   one or more forecasters arranged to forecast a future value of each said signal characteristic;
   one or more forecasters arranged to a future handover margin for each said signal characteristic; and
   one or more processors arranged to determine if, at a predetermined future point in time, another communications channel is available to another network access point for the mobile communications device to handover to from the current communications channel established with the current network access point by:
   determining if the future value of a signal characteristic of said other communications channel is predicted at that time to exceed the value of the equivalent signal characteristic of the current communications channel at that time by at least the value of the handover margin predicted at that time,
   wherein the future handover margin is dynamically dependent on the predicted probability of a trigger error occurring.

13. A communications system arranged to implement a method of triggering a network handover controlled by a communications device in said communications system, the system comprising:
   a plurality of candidate networks with which the communications device can perform a handover operation to;
   one or more signal processors to determine one or more signal characteristics of each signal detected for an available candidate network in said communications system;
   one or more data stores arranged to store data on said signal characteristics as time-series data;
   one or more processor components arranged to:
   forecast a future value of one or more of said detected signal characteristics from time-series data;
   determine a future handover margin for said signal characteristic of the network connection established by said communications device;
   determine if another available candidate network signal characteristic exceeds said handover margin at a future time, and if so,
   control the performance of a handover operation to said other available candidate network, wherein said future handover margin for said signal characteristic is dynamically varied in response to said forecasted signal characteristic, and
   wherein the future handover margin is dynamically dependent on the predicted probability of a trigger error occurring.

14. A communications system as claimed in claim 13, wherein the trigger error comprises a false trigger.

15. A communications system as claimed in claim 13, wherein the trigger error comprises a false non-trigger.

* * * * *